in United States Patent	(10) Patent No.: US 8,301,132 B1
Reeves et al.	(45) Date of Patent: Oct. 30, 2012

(54) PUSH REGISTRY APPLICATION PROGRAMMING INTERFACE FOR CAPTURING EVENTS

(75) Inventors: Raymond Emilio Reeves, Olathe, KS (US); Ryan Alan Wick, Punta Gorda, FL (US); John Marvin Jones, III, Overland Park, KS (US); Wen Xue, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 883 days.

(21) Appl. No.: 12/415,411

(22) Filed: Mar. 31, 2009

(51) Int. Cl.
  *H04M 3/00* (2006.01)
  *H04W 4/00* (2009.01)
(52) U.S. Cl. .................................. 455/418; 370/338

(58) Field of Classification Search ............... 455/414.1, 455/418, 423, 466; 370/338, 328, 329
See application file for complete search history.

(56) References Cited

U.S. PATENT DOCUMENTS

2009/0093249 A1* 4/2009 Zhu et al. ............... 455/433
2009/0270121 A1* 10/2009 Soejima ............... 455/550.1

* cited by examiner

*Primary Examiner* — Michael Faragalla (57) ABSTRACT

A mobile communications device, method, and medium are provided for capturing and handling a wide range of communication events. A registrar populates a push registry with information corresponding to an event handler. The registrar associates the event handler with a trigger event and stores the association in the push registry. An event receiver identifies an occurrence of the trigger event and calls an application management system (AMS) so that the AMS can initiate the event handler. Event filters, which can include user-definable filters, are applied to communication events according to filter definitions associated with the event handler.

19 Claims, 6 Drawing Sheets

PUSH REGISTRY APPLICATION PROGRAMMING INTERFACE FOR CAPTURING EVENTS

BACKGROUND

Many currently available Java mobile communications devices include an Application Management System (AMS) that allows for lifecycle management of Java applications. In addition to allowing for manual initiation of applications, the AMS allows for initiating (e.g., launching) applications based on specific triggers defined through the Java PushRegistry Application Programming Interface (API). The triggers presently supported by the PushRegistry API are limited to time-based alarms, arrival of user datagram protocol (UDP) packets, and arrival of short message service (SMS) messages. Thus, current mobile platforms fail to allow for push-to-x (PTX) events and other traditional services such as voice calls to interact with the AMS and trigger service-related applications.

SUMMARY

Embodiments of the invention are defined by the claims below, not this summary. A high-level overview of embodiments of the invention are provided here for that reason, to provide an overview of the disclosure.

In a first aspect, a set of computer-executable instructions provides an exemplary method for capturing events and handling captured events on a first mobile communications device. According to an embodiment of the method, each of a plurality of event handlers is registered. In embodiments, registering an event handler includes populating a push registry with a unique set of attributes corresponding to the event handler and storing an association between an identification of the event handler and a trigger event. An occurrence of a first communication event is identified and the push registry is referenced to determine that the first communication event corresponds to a first trigger event, which is associated with a first event handler. The exemplary method further includes initiating the first event handler.

In a second aspect, a set of computer-executable instructions provides another exemplary method for capturing events and handling captured events on a first mobile communications device. In an exemplary embodiment, the method includes receiving a registration request from a first event handler. The registration request comprises a trigger event definition, which specifies a first set of communication events that the first event handler is adapted to handle. In an embodiment, the method also includes receiving a definition of a first event filter, which corresponds to a subset of the first set of communication events. The exemplary method further includes associating an identification of the first event handler with the trigger event definition and the first event filter definition. An occurrence of a first communication event is identified and a determination is made that the occurrence of the first communication event satisfies the trigger event definition. Embodiments of the method also include determining whether the occurrence of the first communication event satisfies the event filter definition and, if so, initiating the first event handler.

In another aspect, a mobile communications device is provided that includes an event receiver that detects an occurrence of a communication event. The mobile communications device also includes a registrar that manages a push registry. In embodiments, the push registry includes an association between an event handler and a trigger event. In response to the detection of the occurrence of the communication event, the registrar references the push registry to determine whether the communication event corresponds to the trigger event. Embodiments of the mobile communications device further include an application management system (AMS) that initiates the event handler in response to receiving an alert from the registrar indicating the occurrence of the trigger event.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Embodiments of the present invention provide systems and methods for capturing and handling a wide variety of communication events. By expanding the push registry syntax and providing enhanced call/session management flows, traditional services such as voice calls and modern services such as push-to-x events can cause automatic initiation of software modules to handle the events.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the present invention. The following is a list of these acronyms:

| | |
|---|---|
| AMS | Application Management System |
| API | Application Programming Interface |
| CDMA | Code Division Multiple Access |
| CD-ROM | Compact Disc Read-Only Memory |
| DVD | Digital Versatile Disc |
| EDGE | Enhanced Data Rates for GSM Evolution |
| EEPROM | Electrically Erasable Programmable Read-Only Memory |
| EV-DO | Evolution-Data Optimized |
| GPRS | General Packet Radio Service |
| GSM | Global System for Mobile Communications |
| I/O | Input/Output |
| iDEN | Integrated Digital Enhanced Network |
| J2ME | Java 2 Micro Edition |
| JAD | Java Application Descriptor |

| | |
|---|---|
| LAN | Local Access Network |
| LCD | Liquid Crystal Display |
| MN | Mobile Network |
| PDA | Personal Digital Assistant |
| PTX | Push-to-X |
| RAM | Random Access Memory |
| ROM | Read-Only Memory |
| SMS | Short Message Service |
| TCP | Transmission Control Protocol |
| UDP | User Datagram Protocol |
| UI | User Interface |
| USB | Universal Serial Bus |
| UMTS | Universal Mobile Telecommunications System |
| WAN | Wide Area Network |
| Wi-Max | Worldwide Interoperability for Microwave Access |

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, and the like. The invention may also be practiced in distributed computing environments where tasks are performed by remote-processing devices that are linked through a communications network.

Computer-readable media include both volatile and nonvolatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Figure 1:
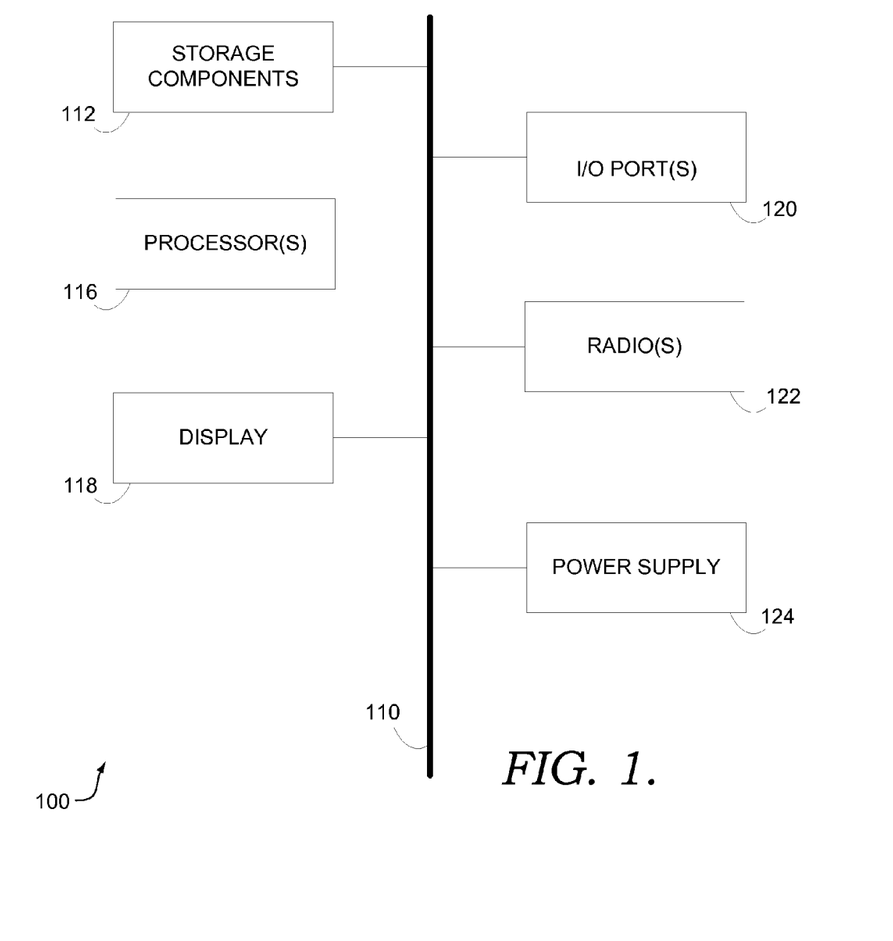
FIG. 1 is a block diagram showing an exemplary mobile communications device in accordance with embodiments of the present invention.

FIG. 1 depicts an illustrative block diagram of a mobile communications device that is suitable for operation of an embodiment of the present invention. Throughout this disclosure, reference will be made to a mobile communications device, such as in FIG. 1 and beyond. FIG. 1 depicts a selection of components that will generally be included in the mobile communications device to help facilitate various functional aspects of embodiments of the invention. As shown, a bus 110 couples, directly or indirectly, the following illustrative components: a storage component 112, a processor 116, a display 118, input/output (I/O) ports 120, a radio or radios 122, and a power supply 124.

Storage components 112 may take the form of the aforementioned computer readable media. As with all of the illustrative components of FIG. 1, although we refer to them sometimes in the singular, that should not be read so as to imply that we mean only a single of each of the components is contemplated within the scope of our invention. To the contrary, by way of example, storage component or components 112 may actually be composed of constituent storage components located within mobile device 100.

Processors 116 facilitate a flow of information among all or a portion of the components shown in FIG. 1 as well as computer usable instructions that help facilitate various aspects of the present invention. For example, in one embodiment, an operating system of mobile device 100 also helps coordinate various functional aspects of the present invention. Processors 116 operate in connection with running such an operating system.

Input/output (I/O) ports 120 provide a way for mobile device 100 to interact with other peripheral components. Illustrative input/output ports include a ear-piece or headphone jack, a USB port, an infrared port, and the like. Different input/output ports 120 could be provided as is needed to facilitate communication of other peripheral components. Display 118 enables a user to view content. In an embodiment, display 118 can be a touchscreen display that receives user input as well. In another embodiment, display 118 is display screen for displaying content such as, for example, an LCD screen.

Radios 122 facilitate the communication of wireless communication signals to and from mobile device 100. Illustrative protocols that can be utilized in connection with an embodiment of the present invention include CDMA, EDGE, EV-DO, iDEN, GPRS, GSM, UMTS, Wi-Fi™, WiMAX, and the like. The radios 122 facilitate wireless communications between the device and a national or even global telecommunications network.

Power supply 124 may also take on a variety of forms ranging from a battery to a charging mechanism to other forms of power sources that serve to provide power to mobile device 100.

The selected components of mobile device 100 are meant to be illustrative in nature, and the various lower-level details of the components are not elaborated on so as to not obscure the present invention. Clearly, some of the components may be absent in some embodiments of the present invention, and additional components not shown may also be part of mobile device 100. Attempting to show all of the various components of mobile device 100 would obscure certain novel aspects, and we will refrain from such elaboration at least for the sake of brevity.

Figure 2:
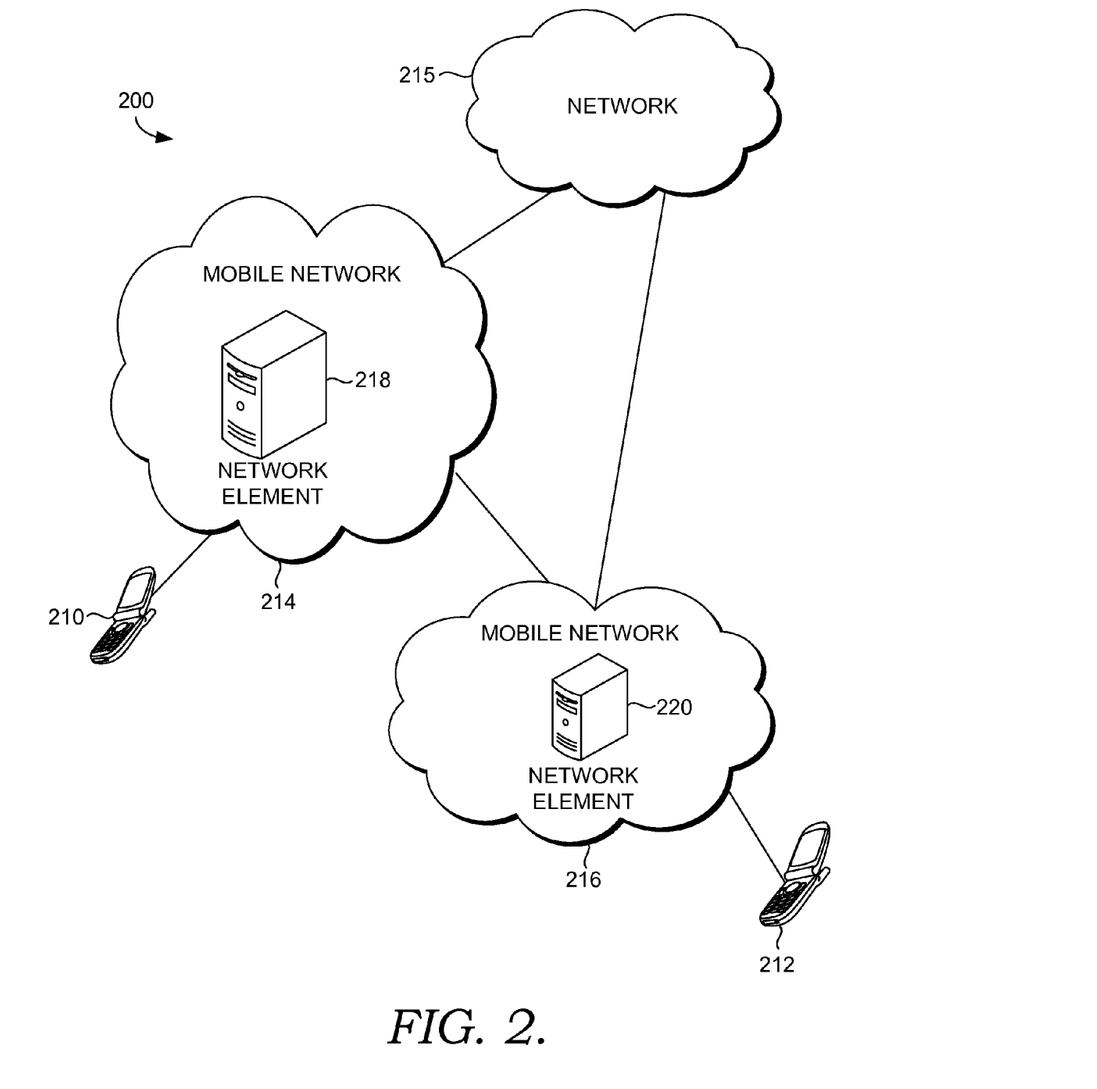
FIG. 2 depicts an illustrative network environment in accordance with embodiments of the present invention.

Turning now to FIG. 2, an illustrative network environment 200 suitable for implementation of embodiments of the invention is depicted. Network environment 200 includes mobile communications devices 210 and 212, mobile networks 214 and 216, and network 215. As illustrated in FIG. 2, mobile networks 214 and 216 include network elements 218 and 220. Network elements 218 and 220 can be any type of server or other network node. Network environment 200 is merely an example of one suitable network environment and is not intended to suggest any limitation as to the scope of use or functionality of the present invention. Neither should network environment 200 be interpreted as having any dependency or requirement related to any single component or combination of components illustrated therein.

It will be understood by those skilled in the art that each of these elements of the network environment 200 is also scalable. That is, for example, network environment 200 can include a large number of mobile devices. Additionally, for example, mobile networks 214 and 216 may actually each include a number of network elements 218 and 220. Any or all of these network elements 218 and 220 may be implemented using any number of server modules, devices, machines, and the like. In some embodiments, mobile devices 210 and 212 communicate via a common network such as mobile network 214 or 216 and in other embodiments, mobile devices 210 and 212 communicate via multiple networks 214, 216. In various embodiments, mobile devices 210 and 212 can communicate with each other using cellular telephony (e.g., CDMA) or using a push-to-x or push-to-talk type of network such as an iDEN network. Additionally, in further embodiments, one or more of mobile devices 210 and 212 can communicate with one or more mobile devices 210, 212.

Mobile networks 214 and 216 can be any of the various types of mobile networks known in the art and can support, for example, any of the protocols mentioned above with respect to FIG. 1. Network 215 can be a local area network (LAN), a mobile network (MN), or a wide area network (WAN) such as the Internet. Although lines of communication are shown in FIG. 2, these connections are intended to be illustrative only and should not be read to limit the configuration of connections in various implementations of embodiments of the present invention.

Mobile devices 210 and 212 are mobile communications devices such as, for example, the mobile communications device 100 described above with reference to FIG. 1. Mobile devices 210 and 212 are capable of communicating with one another, either directly or by way of any combination of the various networks 214, 215, and 216. Mobile devices 210 and 212 are capable of receiving communication events from each other, from network elements 218 and 220, and/or from any number of other devices, networks, servers, and the like. These communication events can include any number of various events such as, for example, call states, media transfers, and push-to-x interactions (e.g., push-to-talk, push-to-view, push-to-locate, etc.). Upon receiving, or otherwise detecting, a communication event, applications on mobile device 210, 212 can be automatically initiated to provide some functionality or experience in the context of the communication event.

According to various embodiments of the present invention, mobile devices 210 and 212 support run-time environments provided by the Java programming language, developed by Sun Microsystems of Mountain View, Calif. In some embodiments, mobile devices 210 and 212 support Java 2 Micro Edition (J2ME), which is a cross-platform programming language that can be embedded into small application environments such as mobile phones, PDAs, two-way pagers, and the like.

Figure 3:
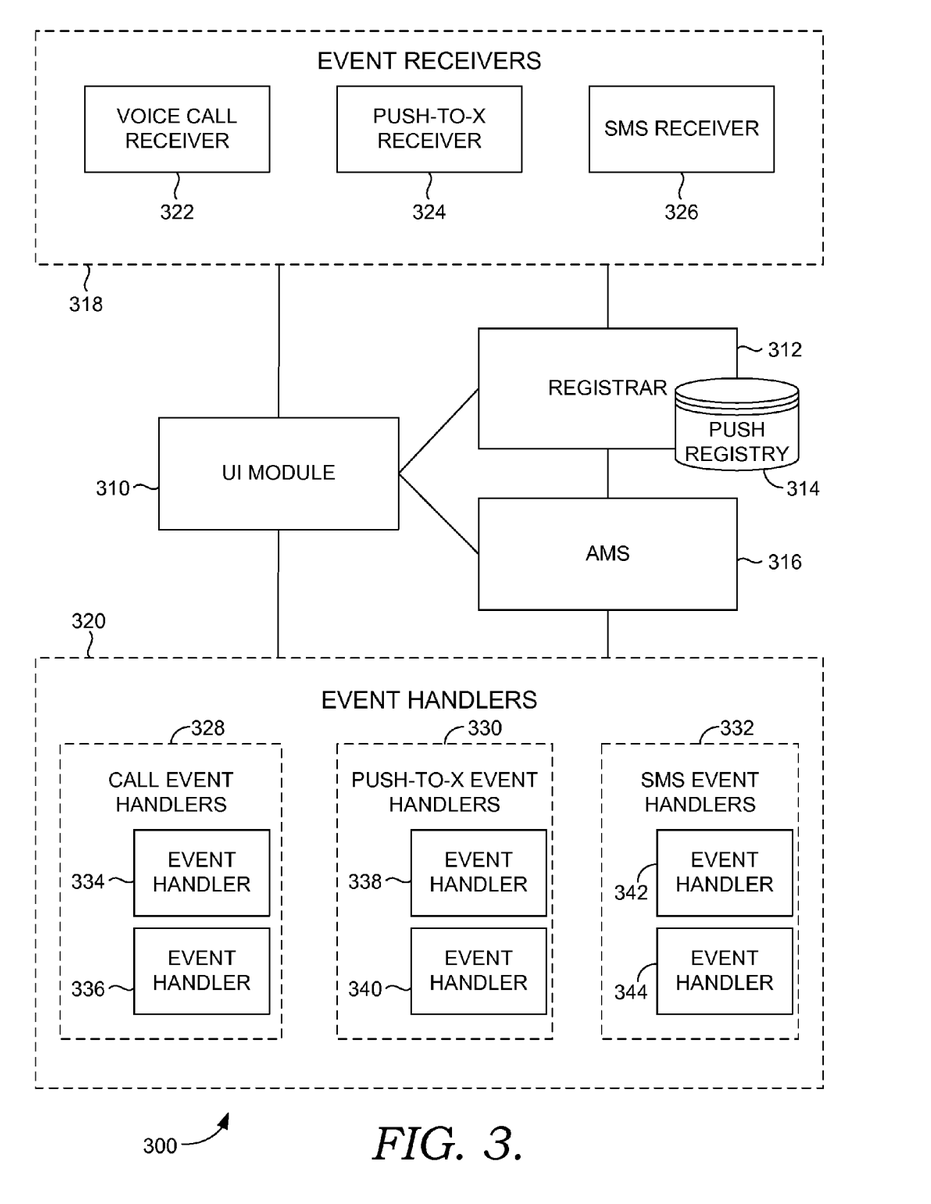
FIG. 3 is a block diagram illustrating an exemplary operating environment in accordance with embodiments of the present invention.

Turning now to FIG. 3, a block diagram is shown that illustrates an exemplary operating environment 300 in a mobile communications device for providing push capabilities such as those described herein. The exemplary operating environment 300 includes a user interface (UI) module 310; a registrar 312; a push registry 314; an application management system (AMS) 316; a set 318 of event receivers 322, 324, and 326; and a set 320 of event handlers 334, 336, 338, 340, 342, and 344. Exemplary operating environment 300 is merely an example of one suitable operating environment and is not intended to suggest any limitation as to the scope of use or functionality of the present invention. Neither should operating environment 300 be interpreted as having any dependency or requirement related to any single component or combination of components illustrated therein. It will be understood by those skilled in the art that each of these elements of the operating environment 300 is also scalable. That is, for example, operating environment 300 can include a large number of event receivers 322, 324, 326 and/or event handlers 334, 336, 338, 340, 342, and 344.

UI module 310 facilitates presenting graphical user interfaces on a display device (not illustrated). According to embodiments of the invention, the graphical user interfaces can be associated with any number of event receivers 322, 324, 326, event handlers 334, 336, 338, 340, 342, 344, or other applications, interfaces, and the like. For example, in an embodiment, voice call receiver 322 is configured to receive incoming voice call events and can provide information to UI module 310 for presenting caller identification information such as phone numbers of incoming callers, names of incoming callers, graphics representing incoming callers, options for accepting or rejecting an incoming call, and the like. Similarly, UI module 310 can be adapted to facilitate presentation of graphical user interfaces that include video displays of callers participating in a video call, options for changing the state of the mobile device with respect to a call, screensavers, and the like.

Registrar 312 facilitates registering one or more of the set 320 of event handlers 334, 336, 338, 340, 342, and 344 by populating the push registry 314 with information associated with the event handlers 334, 336, 338, 340, 342, and 344. As illustrated in FIG. 3, the set 320 of event handlers includes a number of event handler categories 328, 330, and 332. Each category 328, 330, and 332 corresponds to a subset of the set 320 of event handlers that includes one or more event handlers 334, 336, 338, 340, 342, and 344. Each event handler 334, 336, 338, 340, 342, 344 is adapted to handle one or more communication events associated with a particular type of communication or multimedia session. In the illustrated example, the set 320 of event handlers includes call event handlers 328, push-to-x event handlers 330, and push-to-talk event handlers 332. In embodiments, any number of other categories 328, 330, 332 of event handlers can be included in the set 320 of event handlers. As used herein, an event handler 334, 336, 338, 340, 342, 344 is adapted to handle an event if the event handler 334, 336, 338, 340, 342, 344 is designed (e.g., by a developer or service provider) and/or configured (e.g., attributes associated with the event handler are dynamically selected, set, modified, etc. by a user, service provider, or the like) to provide some type of experience in response to an identification of an occurrence of the event. According to various embodiments of the present invention, event receivers 322, 324, and 326 can identify occurrences of events in a number of ways such as, for example, detecting a communication or message associated with a particular port, receiving a notification of the occurrence of the event from an external source such as a network element, another mobile device, a client module within the same mobile device, and the like. In response to the identification of the occurrence of the event, an event handler 334, 336, 338, 340, 342, 344 adapted to handle the event can be automatically initiated, modified, or called to provide a user experience, provide a computational service, or provide some aspect of a communication service. According to various embodiments, event handlers 334, 336, 338, 340, 342, 344 can be applications, portions of applications, application programming interfaces (APIs), program modules, scripts, or the like.

As an example, call event handlers 334 and 336 are adapted to handle communication events associated with a call session such as a voice call, a video call, a multimedia call, or the like. For example, call event handlers 334 and 336 can include applications that handle incoming calls, hold events, redial events, attempted calls, failed attempts to establish calls, and the like. In embodiments, call event handlers 334 and 336 can include applications that facilitate different types of call experiences such as, for example, conference calls, video calls, multimedia calls, and hearing-impaired calls. According to various embodiments, call event handlers can be adapted to handle call events that originate at the mobile device, on a home network, on a foreign network, or even at another mobile device or network associated with another mobile device.

For instance, in one embodiment, event handler 334 can be adapted to handle a hold event initiated at the mobile device on which the event handler 334 resides. That is, if a user of the mobile device is participating in a voice call and wishes to put the other party on hold, the user can provide input such as by pressing a button, selecting a region of a touchscreen, or the like, and that input, which would constitute a trigger event, as described more fully below, would result in an automatic initiation of event handler 334. Event handler 334 can be designed to change the state of the call to a state in which the other party is put on hold. Similarly, in an embodiment, call event handler 336 can be adapted to handle hold events that originate on the other mobile device that is involved in the call session. Thus, if the other party puts the user of the mobile device on hold, a notification of that change in call state can be identified by an event receiver 322, and call event handler 336 can automatically launch to handle the change in call state.

To illustrate an aspect of the functionality provided by embodiments of the invention, suppose, for instance, that the other party's mobile network provides unpleasant "elevator music" during hold states, and that the user of the mobile device would much prefer to listen to music from his own collection of songs stored on the mobile device while the user is on hold. Call event handler 336 can be configured by the developers of the application and/or by user selection of configuration options, to automatically initiate and play (or cause to be played such as by calling a media player) music from a storage module on the mobile device during the hold state. Furthermore, call event handler 336 can be configured to handle an event characterized by a change in the call state from hold to active, wherein call event handler 336 automatically discontinuous providing the media experience to the user in response to the change in call state back to an active call. This illustrative example of an implementation of call event handlers 334 and 336 is merely an example, and it should be appreciated that any number of other types of event handlers 334, 336, 338, 340, 342, 344 can be registered on the mobile device.

With continued reference to FIG. 3, as part of the process of registering an event handler 334, 336, 338, 340, 342, 344, registrar 312 associates the event handler 334, 336, 338, 340, 342, 344 with one or more trigger events and stores that association in the push registry 314. A trigger event is an event that an event handler 334, 336, 338, 340, 342, 344 is adapted to handle. Thus, in response to identification of an occurrence of a trigger event, the associated event handler 320 can be automatically initiated and can provide some type of experience in response to the trigger event. According to embodiments of the invention, trigger events can include any type of communication event that can be detected by the mobile device. For example, trigger events can include incoming voice calls, incoming multimedia calls, incoming push-to-talk messages, incoming push-to-x messages, any number of various events associated with existing calls, and the like.

In embodiments, a trigger event definition can specify one or more of a set of communication event types. In some embodiments, a trigger event definition includes a subset of the set of communication event types, while in other embodiments, a trigger event definition can include the entire set of communication event types. Trigger events are defined through the registrar 312 and the push registry 314. The registrar 312 and push registry 314 are represented by the Java PushRegistry API. Prior to the invention disclosed herein, trigger events supported by the PushRegistry API were limited to time-based alarms, arrival of TCP/UDP packets, and arrival of SMS messages. The present invention includes PushRegistry API design extensions to allow for additional trigger events to be visible to the PushRegistry API. In an embodiment, the PushRegistry syntax is modified to support the tel:, sip:, ptt:, and ptx: strings as well as to support generic call/session states such as, for example, call originated, call arrival, control requested, control received, control released, call answered, call terminated, call forward, call abandoned, call no-answer, digits collected, call on hold, and the like.

According to embodiments of the invention, registrar 312 responds to a registration request from an event handler 334, 336, 338, 340, 342, 344 by ascertaining attributes associated with the event handler 334, 336, 338, 340, 342, 344. Attributes can include, for example, the name of the event handler 334, 336, 338, 340, 342, 344; the types of communication events that the event handler 334, 336, 338, 340, 342, 344 is adapted to handle; port numbers associated with the event handler 334, 336, 338, 340, 342, 344; filter lists associated with the event handler 334, 336, 338, 340, 342, 344; trigger events associated with the event handler 334, 336, 338, 340, 342, 344; and the like. In some embodiments, the event handler 334, 336, 338, 340, 342, 344 is configured to provide these attributes to registrar 312 as part of a registration request. In other embodiments, registrar 312 ascertains the attributes by referencing a descriptor file (e.g., a Java Application Descriptor (JAD)) associated with the event handler 334, 336, 338, 340, 342, 344. Registrar 312 populates push registry 314, which can include a table, database, or other data structure, with the attributes associated with the event handler 334, 336, 338, 340, 342, 344.

As used herein, filter lists can include definitions of event filters that place restrictions on the types of communication events that are to be pushed to a particular event handler 334, 336, 338, 340, 342, 344. Previously, communication events could only be filtered according to characteristics of the IP address associated with an incoming communication event. The present invention provides for filtering according to any number of other characteristics, informational elements, identifiers, and the like. For example, in an embodiment, filter definitions can include identifiers associated with originators of incoming call events. The identifiers can include phone numbers, contact names, geographical locations, and the like. Thus, for instance, in an embodiment of the invention, a filter associated with a call event handler 334, 336 can be defined to specify a set of contact names from whom incoming calls can be handled by the call event handler 334, 336. As another example, other embodiments of the invention can include filters that are defined such that only incoming calls from a particular geographical region are handled by the call event handler 334, 336. In further embodiments, filters can also be associated with call receivers 322, 324, 326 so that incoming communication events such as incoming calls, push-to-talk events, push-to-view events, and the like are filtered first at the call receiver 322, 324, 326 and again before the communication events are passed to the event handler 334, 336, 338, 340, 342, 344 such as by AMS 316, registrar 312, or some other module, which may or may not be illustrated in FIG. 3.

Therefore, for example, in embodiments, a voice call receiver 322 might have an associated filter that is defined such that voice call receiver 322 only accepts voice call events originating from devices in Kansas. Additionally, a conference call event handler 334 can have an associated filter defined such that the conference call event handler 334 only handles incoming communication events associated with conference calls involving more than two parties. Thus, in this example, because incoming voice call events are first filtered at voice call receiver 322 to exclude any communication events not originating in Kansas, and are filtered again by AMS 316, the conference call handler will only end up handling incoming voice conference call events originating in Kansas.

Additionally, user-definable filters can be included in a filter list. According to embodiments of the invention, registrar 312 can place a flag or reference in the push registry 314 and can associate that flag or reference with an event handler 334, 336, 338, 340, 342, 344. Thus, when registrar 312 encounters the flag or reference during registration or at some later time, registrar 312 works with UI module 310 to provide a user interface to the user that can prompt the user for configuration settings. That is, UI module 310 can provide a user interface that presents a list of options from which the user can select to configure a user-definable filter. As an example, a call event handler 334, 336 can be associated with a user-definable filter that allows a user to select the names of particular contacts from which calls can be handled.

As is further illustrated in FIG. 3, registrar 312 communicates with an application management system (AMS) 316. In embodiments, registrar 312 and push registry 314 are part of AMS 316, whereas in other embodiments, registrar 312 and registry 314 can be conceptually separate. AMS 316 can be used to perform a variety of different functions on the mobile communications device such as launching MIDlets and other applications. In embodiments, AMS 316 allows for lifecycle management of applications and event handlers 334, 336, 338, 340, 342, 344. Additionally, mobile device call/session managers can be configured so that every applicable call/session state is notified to AMS 316.

As FIG. 3 further illustrates, a set 318 of event receivers 322, 324, 326 can be implemented for detecting events, receiving incoming messages, and the like. In embodiments, any number of the event receivers 322, 324, and 326 can be included in AMS 316, while in other embodiments, event receivers 322, 324, and 326 can be maintained separately. In further embodiments, event receivers 322, 324, and 326 can be integrated into one program module or application. The exemplary event receivers 322, 324, and 326 illustrated in FIG. 3 are merely examples of event receivers 322, 324, and 326, and any number of other types of event receivers 322, 324, and 326 can be included as well. Event receivers 322, 324, and 326 can identify occurrences of communication events by detecting traffic on a particular port, by receiving a notification of the occurrence of the communication event, by receiving a message, or by any other method suitable for identifying occurrences of communication events associated with the mobile device.

Figure 4:
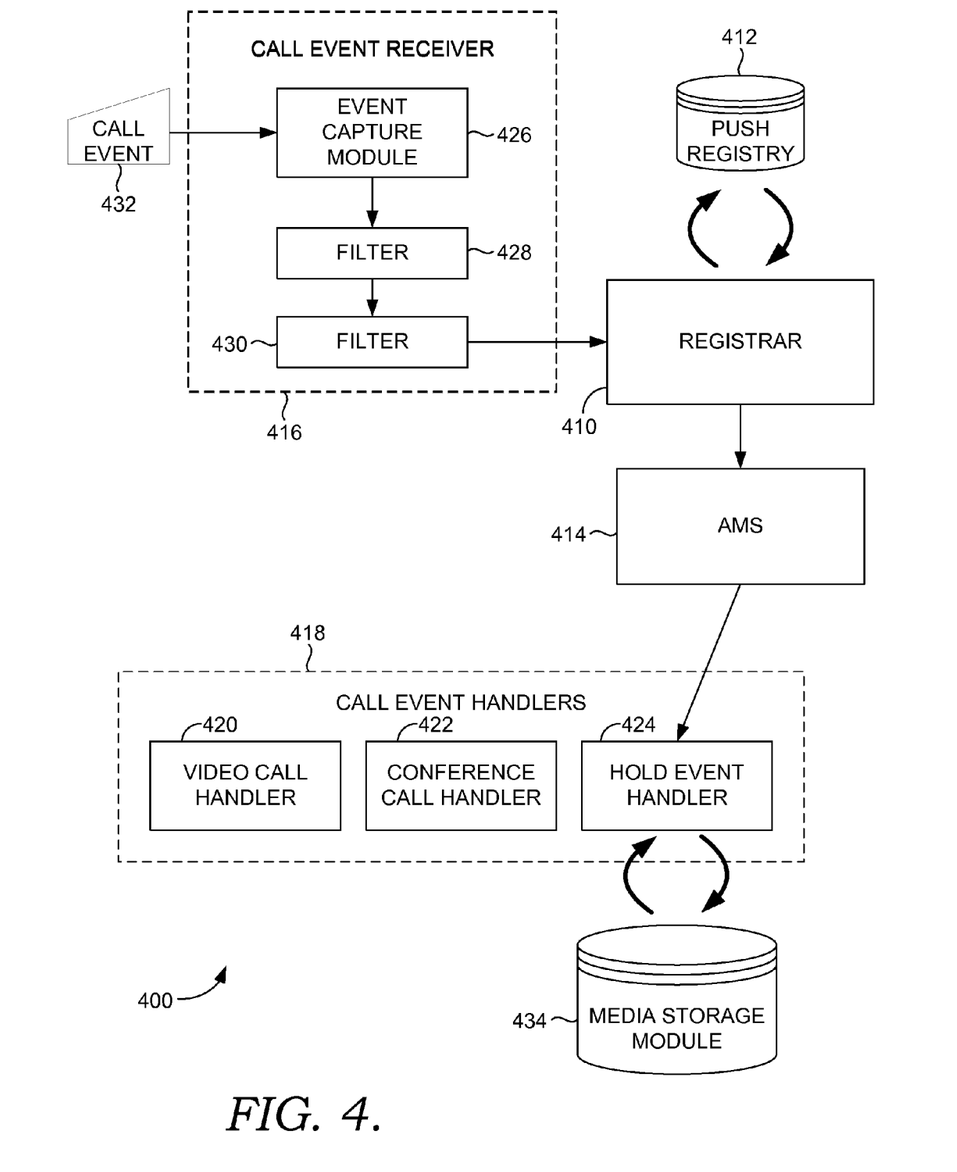
FIG. 4 depicts an exemplary implementation of an embodiment of the present invention.

Turning now to FIG. 4, a block schematic diagram is shown that illustrates an exemplary implementation 400 of the invention. As illustrated in FIG. 4, a call event receiver 416 includes an event capture module 426 and filters 428 and 430. As illustrated, a call event 432 is received (e.g., detected) by event capture module 426. Event capture module 426 can be adapted to identify (e.g., capture) occurrences of communication events by listening for traffic on a particular port, by interpreting notifications of events, and the like. Event capture module 426 can be further configured to identify the type of communication event being received, as well as any number of other attributes associated with a detected event. After identifying the type of communication event that characterizes call event 432, call event 432 is processed through filters 428 and 430. Filters 428 and 430, as discussed above, can restrict the types of communication events that are captured or used to push a particular functionality. If, or to the extent that, call event 432 satisfies filter definitions specified by filters 428 and 430, call event receiver 416 notifies registrar 410 about the call event 432. In some embodiments, call event receiver 416 ascertains a number of characteristics of call event 432 and provides those characteristics to registrar 410.

Registrar 410 references push registry 412 to determine whether call event 432 corresponds to an event trigger associated with a call event handler 420, 422, 424. Thus, as illustrated, registrar 410 could determine that call event 432 is a hold event originated during a voice call session and can further determine that hold event handler 424 is adapted to handle events of the same type as call event 432. Upon determining that hold event handler 424 is registered to be automatically initiated in response to identification of an occurrence of call event 432, registrar 410 notifies AMS 414 of the occurrence of call event 432 and AMS 414 initiates hold event handler 424. As FIG. 4 further illustrates, hold event handler 424 can access media content from a media storage module 434 on the mobile device for presentation to the user.

Figure 5:
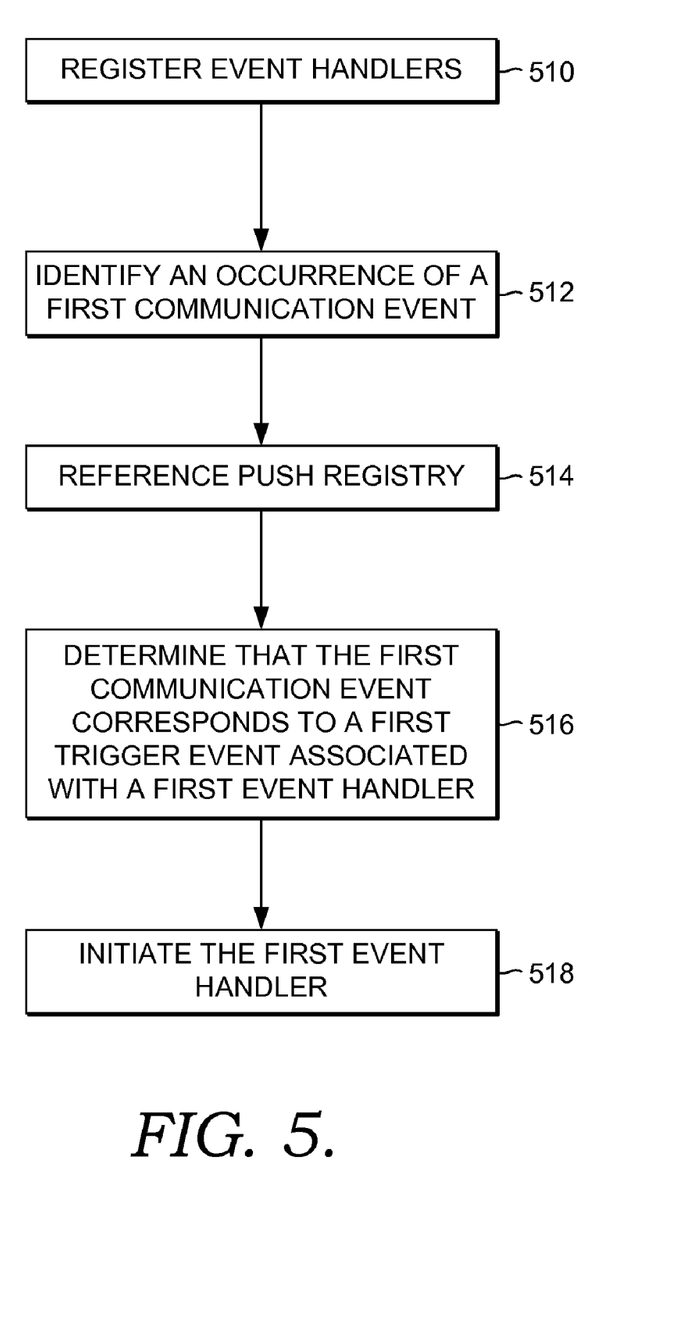
FIG. 5 depicts an illustrative method of capturing and handling communication events on a mobile communications device in accordance with embodiments of the present invention.

To recapitulate, we have described a mobile device, operating environment, and methods for capturing a wide range of types of communication events and for handling captured events. Turning to FIG. 5, a flow diagram is provided, showing an illustrative method 500 of capturing events and handling captured events on a first mobile communications device. At a first illustrative step, step 510, the method includes registering a number of event handlers. According to embodiments of the invention, registering event handlers can include populating a push registry with a unique set of attributes corresponding to each of the event handlers. In embodiments, registering an event handler can also include associating an identification of the event handler with a trigger event, wherein the association is stored in the push registry.

As described above with reference to various embodiments of the present invention, an event handler can include an application that provides a user experience automatically in response to the identification of the occurrence of the trigger event. In embodiments, the application can be associated with any number of types of events such as a voice call event, a video call event, a multimedia call event, and a push-to-x event. In some embodiments, the first trigger event definition can include a set of communication events and the unique set of attributes corresponding to the first event handler can include an identification of a filter that defines a restriction on the type of communication events that the first event handler is configured to handle. In an embodiment, for example, the filter includes a specification of a characteristic associated with events of the type of the first communication event. In another embodiment, the identification of the filter can include a reference to a user-definable filter associated with the first event handler. In that case, the exemplary method can further include applying the user-definable filter by providing a user interface having a set of options from which a user can select. The options can include one or more restrictions on the type of communication events that the first event handler is adapted to handle.

At step 512, an event receiver identifies the occurrence of a first communication event. According to embodiments of the invention, identifying the occurrence of the first communication event includes receiving a notification of the occurrence from a network element associated with a home network providing service to the mobile communications device. In other embodiments, identification of the occurrence of the first communication event can include receiving a notification of the occurrence from a network element associated with a foreign network providing service to a second mobile communications device. In further embodiments, identification of the occurrence of the first communication event can include detecting an arrival of a message or other communication from the second mobile communications device.

At step 514, a registrar references a push registry to determine whether the first communication event corresponds to a first trigger event, the first trigger event being associated with a first event handler. Thus, at step 516, the registrar determines that the first communication event corresponds to a first trigger event and at a final illustrative step 518, the first event handler is initiated.

Figure 6:
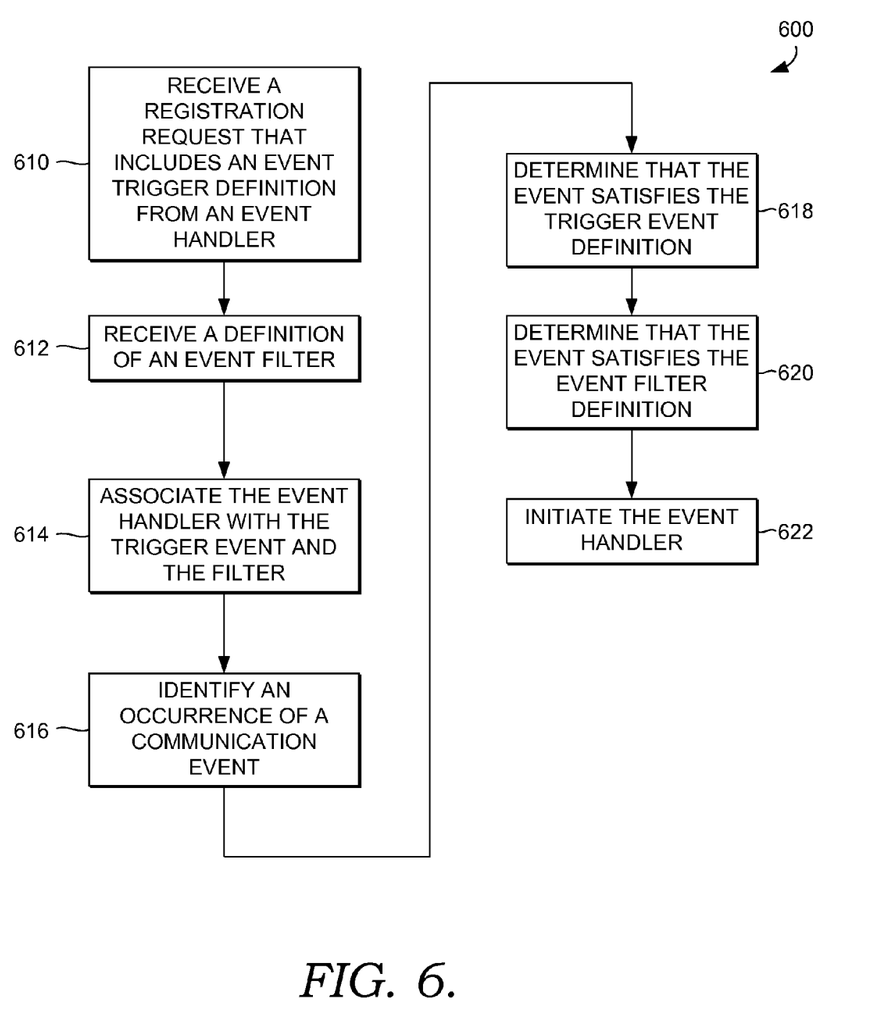
FIG. 6 depicts another illustrative method of capturing and handling communication events on a mobile communications device in accordance with embodiments of the present invention.

Turning now to FIG. 6, a flow diagram showing an illustrative method 600 of capturing events and handling captured events on a mobile communications device is shown. At a first illustrative step, step 610, a registrar receives a registration request from a first event handler. In embodiments of the invention, the registration request includes a trigger event definition specifying a first set of communication events that the first event handler is adapted to handle. At step 612, the registrar receives a definition of a first event filter. According to some embodiments, the first event filter corresponds to a subset of the first set of communication events, and in other embodiments, the first event filter corresponds to all of the members of the first set of communication events.

As shown at step 614 of FIG. 6, the registrar associates an identification of the first event handler with the trigger event definition and the first event filter definition and at step 616 an event receiver identifies an occurrence of a first communication event. As further illustrated at step 618 of FIG. 6, the illustrative method includes determining that the occurrence of the first communication event satisfies the trigger event definition and at step 620, the illustrative method includes determining whether the occurrence of the first communication event satisfies the event filter definition. At a final illustrative step, step 622, an application management system (AMS) initiates the first event handler if the occurrence of the first communication event satisfies the event filter definition.

Many different arrangements of the various components depicted, as well as components not shown, are possible without departing from the spirit and scope of the present invention. Embodiments of the present invention have been described with the intent to be illustrative rather than restrictive. A skilled artisan may develop alternative means of implementing the aforementioned improvements without departing from the scope of the present invention. It will be further understood that certain features and subcombinations are of utility and may be employed without reference to other features and subcombinations and are contemplated within the scope of the claims.

The invention claimed is:

1. One or more computer-readable media having computer-executable instructions embodied thereon for performing a method of capturing events and handling captured events on a first mobile communications device, the method comprising:
registering a plurality of event handlers, said registering comprising populating a push registry with a unique set of attributes corresponding to each of the plurality of event handlers, and said registering further comprising associating an identification of each of the plurality of event handlers with a trigger event, wherein the association is stored in the push registry, and wherein the unique set of attributes corresponding to the first event handler comprises an identification of a filter associated with the first event handler, the filter comprising a restriction on the type of communication events that the first event handler is configured to handle;
identifying an occurrence of a first communication event;
referencing the push registry to determine that the first communication event corresponds to a first trigger event, wherein the first trigger event is associated with a first event handler; and
initiating the first event handler.

2. The media of claim 1, wherein one or more of the plurality of event handlers comprises an application that provides a user experience, the user experience being provided automatically in response to identification of the occurrence of the trigger event, wherein the application is associated with at least one of a voice call event, a video call event, a multimedia call event, a push-to-talk event, and a push-to-x event.

3. The media of claim 1, wherein the first trigger event definition comprises a set of communication events, wherein the first event handler is configured to provide a user experience in response to an occurrence of any one or more events of the set of communication events.

4. The media of claim 1, wherein identifying the occurrence of the first communication event comprises receiving a notification of said occurrence from a network element associated with a home network providing service to the mobile communications device.

5. The media of claim 1, wherein identifying the occurrence of the first communication event comprises receiving a notification of said occurrence from a network element associated with a foreign network providing service to a second mobile communications device.

6. The media of claim 1, wherein the filter comprises a specification of a characteristic associated with events of the type of the first communication event.

7. The media of claim 1, wherein the identification of the filter comprises a reference to a user-definable filter associated with the first event handler.

8. The media of claim 7, further comprising applying the user-definable filter, wherein said applying comprises providing a user interface having a set of options from which a user can select, said options comprising one or more restrictions on the type of communication events that the first event handler is adapted to handle.

9. A mobile communications device comprising a computer storage medium having a plurality of computer software modules embodied thereon, the computer software modules being executed by a processor and comprising:
an event receiver that detects an occurrence of a communication event;
a registrar that manages a push registry, the push registry comprising an association between an event handler and a trigger event, the trigger event being associated with at least one of a voice call event, a video call event, a multimedia call event, a push-to-talk event, and a push-to-x event; wherein the registrar receives a notification of the occurrence of the communication event from the event receiver, and in response to receiving the notification, references the push registry to determine whether the communication event corresponds to the trigger event; and
an application management system (AMS) that initiates the event handler in response to receiving an alert from the registrar, wherein the registrar generates the alert, the alert indicating an occurrence of the trigger event if the communication event corresponds to the trigger event.

10. The mobile communications device of claim 9, wherein the event receiver comprises an event capture module that identifies a plurality of characteristics corresponding to the communication event.

11. The mobile communications device of claim 9, wherein the event receiver further comprises a filter, the filter being adapted to determine whether to capture the communication event.

12. The mobile communications device of claim 11, wherein the filter comprises a user-definable filter, the mobile communications device further comprises a user interface module that provides a user interface having a set of options from which a user can select to define the user-definable filter, each of said set of options associated with a characteristic corresponding to the communication event.

13. The mobile communications device of claim 12, wherein said registering comprises placing a tag in the push registry, the tag comprising a reference to the user-definable filter.

14. The mobile communications device of claim 13, wherein the user interface module is adapted to receive a user selection of one or more of the set of options, and wherein the event receiver applies the user-definable filter to determine whether the first event handler is configured to handle the first communication event.

15. One or more computer-readable media having computer-executable instructions embodied thereon for performing a method of capturing events and handling captured events on a mobile communications device, the method comprising:
- receiving a registration request from a first event handler, wherein the registration request comprises a trigger event definition, the trigger event definition specifying a first set of communication events that the first event handler is adapted to handle;
- receiving a definition of a first event filter, wherein the first event filter corresponds to a subset of the first set of communication events;
- associating an identification of the first event handler with the trigger event definition and the first event filter definition;
- identifying an occurrence of a first communication event;
- determining that said occurrence of the first communication event satisfies the trigger event definition;
- determining whether said occurrence of the first communication event satisfies the event filter definition; and
- initiating the first event handler if said occurrence of the first communication event satisfies the event filter definition.

16. The media of claim 15, wherein the first event handler comprises an application that provides a user experience, the user experience being provided automatically in response to identification of the occurrence of the trigger event.

17. The media of claim 16, wherein the application is associated with at least one of a voice call event, a video call event, a multimedia call event, a push-to-talk event, and a push-to-x event.

18. The media of claim 15, wherein the first trigger event definition comprises a set of communication events, wherein the first event handler is configured to provide a user experience in response to an occurrence of anyone or more events of the set of communication events.

19. The media of claim 15, wherein the registration request further comprises a unique set of attributes corresponding to the first event handler, the set of attributes comprising an identification of a filter associated with the first event handler, the filter comprising a restriction on the type of communication events that the first event handler is configured to handle.

* * * * *